(12) United States Patent
Way et al.

(10) Patent No.: US 11,010,775 B2
(45) Date of Patent: May 18, 2021

(54) DETERMINING SHOPPING DURATION BASED ON A MOVEMENT OF A USER DEVICE AND TRANSACTION DATA

(71) Applicant: Capital One Services, LLC, McLean, VA (US)

(72) Inventors: Brendan Way, Brooklyn, NY (US); Abdelkadar M'Hamed Benkreira, Washington, DC (US); Taurean Butler, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 43 days.

(21) Appl. No.: 16/525,061

(22) Filed: Jul. 29, 2019

(65) Prior Publication Data
US 2021/0035134 A1 Feb. 4, 2021

(51) Int. Cl.
| | |
|---|---|
| G06Q 10/00 | (2012.01) |
| G06Q 30/02 | (2012.01) |
| H04W 4/021 | (2018.01) |
| H04W 4/33 | (2018.01) |
| G06Q 30/06 | (2012.01) |
| G06Q 20/32 | (2012.01) |
| G06N 20/00 | (2019.01) |

(52) U.S. Cl.
CPC ......... *G06Q 30/0205* (2013.01); *G06N 20/00* (2019.01); *G06Q 20/3223* (2013.01); *G06Q 20/3224* (2013.01); *G06Q 30/0224* (2013.01); *G06Q 30/0639* (2013.01); *H04W 4/021* (2013.01); *H04W 4/33* (2018.02)

(58) Field of Classification Search
None
See application file for complete search history.

(56) References Cited

U.S. PATENT DOCUMENTS

| | | | | |
|---|---|---|---|---|
| 7,679,522 | B2 * | 3/2010 | Carpenter | B62B 3/1424 340/688 |
| 7,714,723 | B2 * | 5/2010 | Fowler | G08B 13/248 340/572.1 |
| 7,741,808 | B2 * | 6/2010 | Fowler | B62B 3/1428 320/107 |

(Continued)

OTHER PUBLICATIONS

Gilliland, Nikki, How retailers are using geofencing to improve in-store CX, Jan. 15, 2018, Econsultancy, https://econsultancy.com/how-retailers-are-using-geofencing-to-improve-in-store-cx/, p. 1-5. (Year: 2018).*

*Primary Examiner* — Joseph M Waesco
(74) *Attorney, Agent, or Firm* — Harrity & Harrity, LLP

(57) ABSTRACT

A device may detect a first entry of a first user device of a first user into a merchant area. The device may monitor a movement of the first user device within the merchant area. The movement may include a transition from a shopping area of the merchant area to a checkout area of the merchant area. The device may detect a transaction between the first user and the merchant. The device may determine a shopping duration for the first user and a checkout duration for the first user. The device may detect a second entry of a second user device of a second user into the merchant area. The device may perform one or more actions based on detecting the second entry. The one or more actions may be performed selectively based on the shopping duration or the checkout duration of the first user.

20 Claims, 9 Drawing Sheets

(56) References Cited

U.S. PATENT DOCUMENTS

| | | | | |
|---|---|---|---|---|
| 7,762,458 | B2* | 7/2010 | Stawar | G06Q 20/20 235/383 |
| 7,782,194 | B2* | 8/2010 | Stawar | B62B 3/1424 340/539.13 |
| 10,163,148 | B1* | 12/2018 | Chatterjee | G06Q 30/0631 |
| 10,217,120 | B1* | 2/2019 | Shin | G06Q 10/06393 |
| 10,262,331 | B1* | 4/2019 | Sharma | H04L 67/22 |
| 10,264,393 | B2* | 4/2019 | Sprogis | G06Q 30/0207 |
| 10,648,823 | B2* | 5/2020 | Bagchi | H04W 4/021 |
| 2006/0200378 | A1* | 9/2006 | Sorensen | G06Q 30/0203 705/7.29 |
| 2008/0231431 | A1* | 9/2008 | Stawar | B62B 3/142 340/425.5 |
| 2008/0237339 | A1* | 10/2008 | Stawar | B62B 3/1408 235/383 |
| 2008/0238615 | A1* | 10/2008 | Carpenter | G06Q 30/02 340/5.91 |
| 2010/0274627 | A1* | 10/2010 | Carlson | G06Q 20/3224 705/51 |
| 2011/0106624 | A1* | 5/2011 | Bonner | H04L 67/18 705/14.58 |
| 2012/0078700 | A1* | 3/2012 | Pugliese, III | G06Q 30/0224 705/14.25 |
| 2012/0190386 | A1* | 7/2012 | Anderson | G01S 19/14 455/456.3 |
| 2012/0249325 | A1* | 10/2012 | Christopher | G06Q 30/02 340/539.13 |
| 2013/0013420 | A1* | 1/2013 | Bamborough | G06Q 30/02 705/14.69 |
| 2014/0079282 | A1* | 3/2014 | Marcheselli | G06T 7/73 382/103 |
| 2014/0180793 | A1* | 6/2014 | Boal | G06Q 30/0251 705/14.43 |
| 2014/0222501 | A1* | 8/2014 | Hirakawa | G06Q 30/0201 705/7.29 |
| 2014/0358639 | A1* | 12/2014 | Takemoto | G06K 9/00335 705/7.33 |
| 2015/0073899 | A1* | 3/2015 | Carpenter | H04W 84/02 705/14.49 |
| 2017/0201779 | A1* | 7/2017 | Publicover | H04N 21/4532 |
| 2017/0280290 | A1* | 9/2017 | Jones | G06K 7/1095 |
| 2018/0350144 | A1* | 12/2018 | Rathod | G06Q 20/3276 |
| 2019/0095933 | A1* | 3/2019 | Doherty | H04W 4/029 |
| 2019/0385216 | A1* | 12/2019 | Stawar | B62B 3/142 |
| 2020/0005347 | A1* | 1/2020 | Boal | G06Q 30/0245 |

* cited by examiner

DETERMINING SHOPPING DURATION BASED ON A MOVEMENT OF A USER DEVICE AND TRANSACTION DATA

BACKGROUND

An individual may provide people, or computing devices, with information regarding a location of the individual for a variety of reasons. A computing device of a user may often include one or more components capable of identifying a location of the computing device (e.g., global positioning system (GPS) component, Wi-Fi component, and/or the like) to determine a geographic location of the computing device, which may be provided to other users and/or devices.

SUMMARY

According to some implementations, a method may include detecting, by a device, a first entry of a first user device into a merchant area, wherein the first user device is associated with a first user, wherein the merchant area is a geographic area associated with a merchant, and wherein the first entry is associated with an entry time. The method may include monitoring, by the device and based on detecting the first entry, a movement of the first user device within the merchant area, wherein the movement includes a transition from a shopping area of the merchant area to a checkout area of the merchant area, and wherein the transition is associated with a transition time. The method may include detecting, by the device, a transaction between the first user and the merchant, wherein the transaction is associated with a transaction time. The method may include determining, by the device, a shopping duration for the first user based on the entry time and the transition time, and a checkout duration for the first user based on the transition time and the transaction time. The method may include detecting, by the device, a second entry of a second user device into the merchant area, wherein the second user device is associated with a second user. The method may include performing, by the device, one or more actions based on detecting the second entry, wherein the one or more actions are performed selectively based on the shopping duration or the checkout duration of the first user.

According to some implementations, a non-transitory computer-readable medium may store one or more instructions that, when executed by one or more processors of a device, may cause the one or more processors to detect an entry of a first user device into a merchant area, wherein the first user device is associated with a first user, wherein the merchant area is a geographic area associated with a merchant, and wherein the entry is associated with an entry time. The one or more instructions may cause the one or more processors to detect a transaction between the first user and the merchant, wherein the transaction is associated with a transaction time. The one or more instructions may cause the one or more processors to determine, based on detecting the transaction, a shopping duration for the first user based on the entry time and the transaction time. The one or more instructions may cause the one or more processors to determine a second user that is associated with the merchant or the first user, wherein the second user is associated with a second user device. The one or more instructions may cause the one or more processors to perform one or more actions based on determining the second user, wherein the one or more actions are performed selectively based on the shopping duration of the first user.

According to some implementations, a device may include one or more memories and one or more processors, communicatively coupled to the one or more memories, configured to detect a first entry of a user device into a merchant area, wherein the user device is associated with a user, wherein the merchant area is a geographic area associated with a merchant, and wherein the first entry is associated with an entry time. The one or more processors may monitor, based on detecting the first entry, a movement of the user device within the merchant area, wherein the movement includes a transition from a shopping area of the merchant area to a checkout area of the merchant area, and wherein the transition is associated with a transition time. The one or more processors may detect a transaction between the user and the merchant, wherein the transaction is associated with a transaction time. The one or more processors may determine, based on detecting the transaction, a shopping duration for the user based on the entry time and the transition time, and a checkout duration for the user based on the transition time and the transaction time. The one or more processors may detect a second entry of the user device into the merchant area. The one or more processors may perform one or more actions based on detecting the second entry, wherein the one or more actions are performed selectively based on the shopping duration or the checkout duration of the user.

DETAILED DESCRIPTION

Figure 1A:
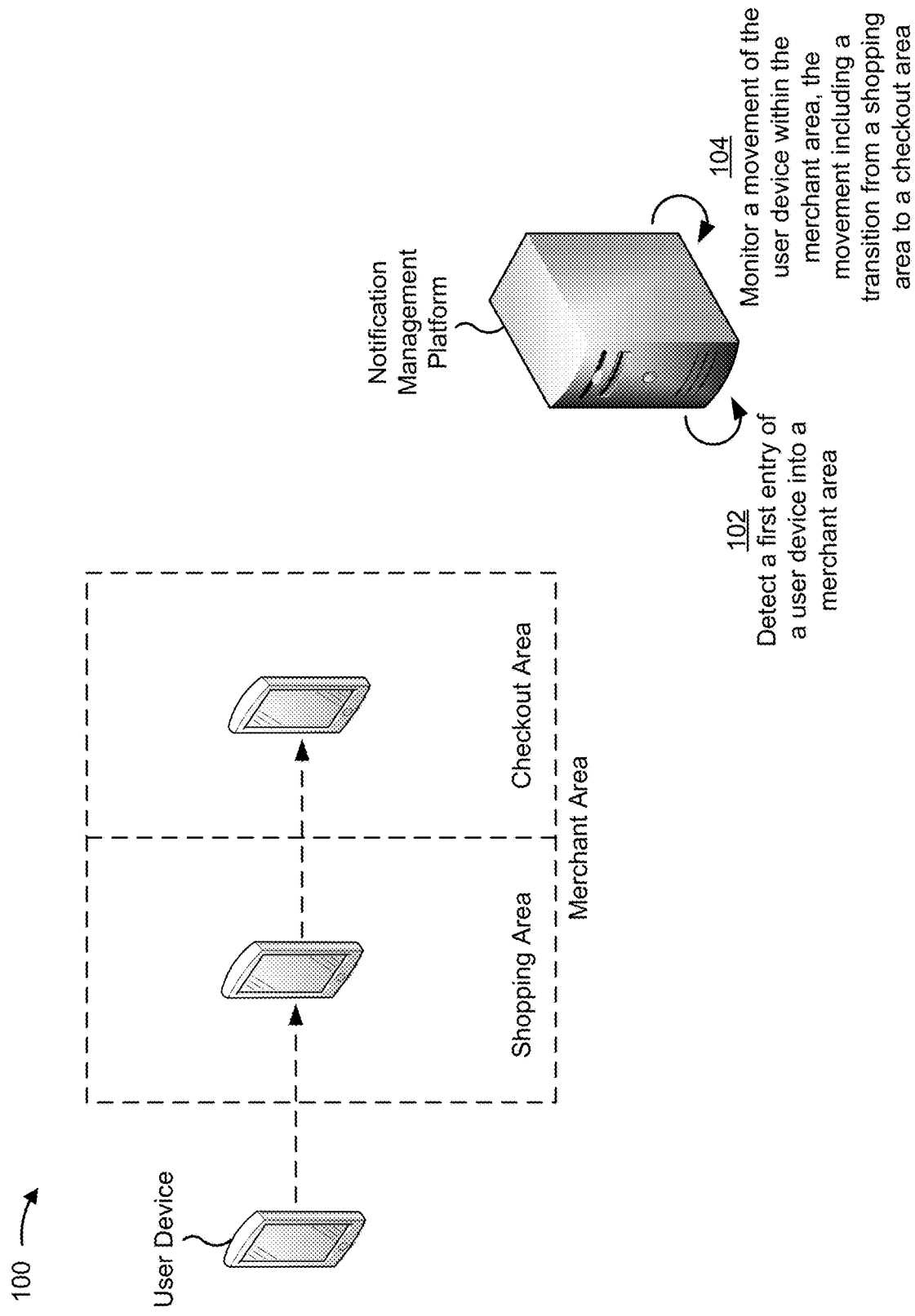
FIGS. 1A-1D are diagrams of one or more example implementations described herein.

The following detailed description of example implementations refers to the accompanying drawings. The same reference numbers in different drawings may identify the same or similar elements.

A merchant may transmit notifications to a user device of a user before, during, and/or after an activity of the user that involves a store (e.g., a brick-and-mortar store) or other location of the merchant. Often, the notifications are intended to provide information about the merchant and/or the store in order to enhance an experience of the user, provide discounts or other incentives to transact with the merchant, and/or the like. In some instances, the merchant may transmit a notification upon detecting an entry of the user device into a geographic area (e.g., a geofence) associated with the store or other location of the merchant.

However, tracking a location of a user device within a store or merchant area is difficult using current techniques that rely solely on location data. Such current techniques lack awareness of a shopping behavior or other activity associated with the user and/or other users at the merchant location, and therefore are imprecise. For example, current techniques may result in a notification being transmitted to the user device after the user has completed a transaction with the merchant (e.g., when the user remains at the merchant's store after the transaction, which may be common at department stores). In such a case, the notification may be unnecessary (e.g., because the notification may not affect a shopping behavior of the user), and thus wastes resources (e.g., processor resources, memory resources, network resources, and/or the like) associated with transmitting the notification.

Some implementations described herein provide a notification management platform that provides notifications based on an activity of one or more users in association with a merchant location. For example, the notification management platform may determine a shopping duration and/or a checkout duration associated with a merchant using a combination of location data from user devices and transaction data associated with users. The notification management platform may determine whether to transmit a notification to a user device, when to transmit the notification, and/or a type of notification to transmit based on the shopping duration and/or the checkout duration that is determined.

In this way, the notification management platform facilitates location tracking in a store with improved precision, thereby improving a relevance of notifications transmitted to users. For example, the notification management platform may transmit a particular type of notification to a second user based on a shopping duration and/or a checkout duration of a first user. As another example, the notification management platform may determine not to transmit a notification to a second user based on a shopping duration and/or a checkout duration of a first user. Accordingly, the notification management platform improves an impact (e.g., an open rate, a click rate, and/or the like) of notifications that are transmitted, while conserving resources (e.g., processor resources, memory resources, network resources, and/or the like) by selectively transmitting notifications based on the shopping duration and/or the checkout duration.

FIGS. 1A-1D are diagrams of one or more example implementations 100 described herein. As shown in FIGS. 1A-1D, example implementation(s) 100 may include one or more user devices and a notification management platform.

A user device may be associated with a user that is soon to be engaged in a shopping activity, is currently engaged in a shopping activity, and/or was recently engaged in a shopping activity. A user may be engaged in a shopping activity when the user is present (e.g., physically present) at a store, a restaurant, a bar, a service establishment (e.g., a barber shop, a movie theater, a spa, and/or the like), any other location associated with a merchant or a commercial activity, and/or the like. In the example implementations, a shopping activity, a shopping area, or a shopping duration is to include any commercial activity, area, or duration associated with a merchant, whether the commercial activity involves transaction activity for goods or services.

In some implementations, the notification management platform may be associated with a merchant. For example, the notification management platform may be associated with a merchant that has one or more physical locations (e.g., brick-and-mortar locations or another physical presence associated with a geographic location). Additionally, or alternatively, the notification management platform may be associated with a financial institution (e.g., a bank, a credit provider, a payment processor, and/or the like). For example, the notification management platform may be associated with a financial institution that provides payment gateway services to a merchant.

As shown in FIG. 1A, and by reference number 102, the notification management platform may detect a first entry of a user device into a merchant area. The first entry may be associated with a first user device of a first user.

The merchant area may be a geographic area, and the geographic area may be a geofence defined by a plurality of coordinates (e.g., latitude and longitude coordinates). In some implementations, the merchant area may be identified by one or more beacons associated with the merchant area. In some implementations, the merchant area may be associated with a physical location of a merchant. For example, the merchant area may be a store (e.g., a building or a portion of a building, as well as associated parking facilities) of the merchant, a building or a portion of a building that includes the store of the merchant (e.g., a shopping mall), an area that includes the store of the merchant (e.g., a shopping district), and/or the like. In some implementations, the merchant area may be a portion of a physical location of a merchant. For example, the merchant area may be a department of a store (e.g., a department relating to a particular type of goods, a department relating to a particular brand of goods, and/or the like).

The notification management platform may process location data (e.g., GPS data) generated by the user device to detect whether the user device has entered the merchant area. For example, the notification management platform may detect entry of the user device into the merchant area by determining that a location of the user device (e.g., based on the location data of the user device) is within the merchant area (e.g., a geofence). The location data may be associated with time data. Thus, the notification management platform may determine an entry time of an entry of the user device into the merchant area based on the time data associated with the location data. In some implementations, the notification management platform may process (e.g., using a triangulation analysis) signal data from the user device and one or more beacons associated with the merchant area to detect whether the user device entered the merchant area. In such cases, the signal data of the user device also may be associated with time data.

As shown by reference number 104, the notification management platform may monitor a movement of the user device (e.g., based on location data generated by the user device) within the merchant area. For example, the notification management platform may monitor the movement of the user device within the merchant area in order to detect a transition from a shopping area of the merchant area to a checkout area of the merchant area. The transition may be associated with a transition time. The notification management platform may determine the transition time of a transition of the user device from a shopping area to a checkout area based on the time data associated with the location data.

The shopping area may be a portion of the merchant area where goods are displayed, where customers browse goods, where customers are seated, where customers are provided services, and/or the like. The shopping area may be a geofence defined by a plurality of coordinates (e.g., latitude and longitude coordinates). Additionally, or alternatively, the shopping area may be identified by one or more beacons associated with the shopping area.

In some implementations, the notification management platform, or another device, may use one or more artificial intelligence techniques, such as machine learning, deep learning, and/or the like, to determine a location of the shopping area. In such a case, the notification management platform may use a machine learning model to determine the location of the shopping area. For example, the notification management platform, or another device, may train the machine learning model based on one or more parameters associated with a location of a shopping area, such as locations of user devices upon entering the merchant area, locations of user devices before transactions with the merchant are registered, and/or the like. The notification management platform, or another device, may train the machine learning model, according to the one or more parameters, using historical location data associated with a plurality of user devices. Using the historical data and the one or more parameters as inputs to the machine learning model, the notification management platform may identify whether locations of user devices are associated with a shopping area to thereby determine the location of the shopping area.

The checkout area may be a portion of the merchant area where customers pay for goods and/or services of the merchant (e.g., where customers participate in a transaction with the merchant), where transaction devices of the merchant are located, where customers form queues to pay for goods and/or services, and/or the like. The checkout area may be a geofence defined by a plurality of coordinates (e.g., latitude and longitude coordinates). Additionally, or alternatively, the checkout area may be identified by one or more beacons associated with the checkout area.

In some implementations, the notification management platform, or another device, may use a machine learning model to determine a location of the checkout area in a manner similar to that discussed above for determining the location of the shopping area. For example, the notification management platform, or another device, may train the machine learning model based on one or more parameters associated with a location of a checkout area, such as locations of user devices prior to exiting the merchant area, locations of user devices when transactions with the merchant are registered, and/or the like. Using historical location data from a plurality of user devices and the one or more parameters as inputs to the machine learning model, the notification management platform may identify whether locations of user devices are associated with a checkout area to thereby determine the location of the checkout area.

Figure 1B:
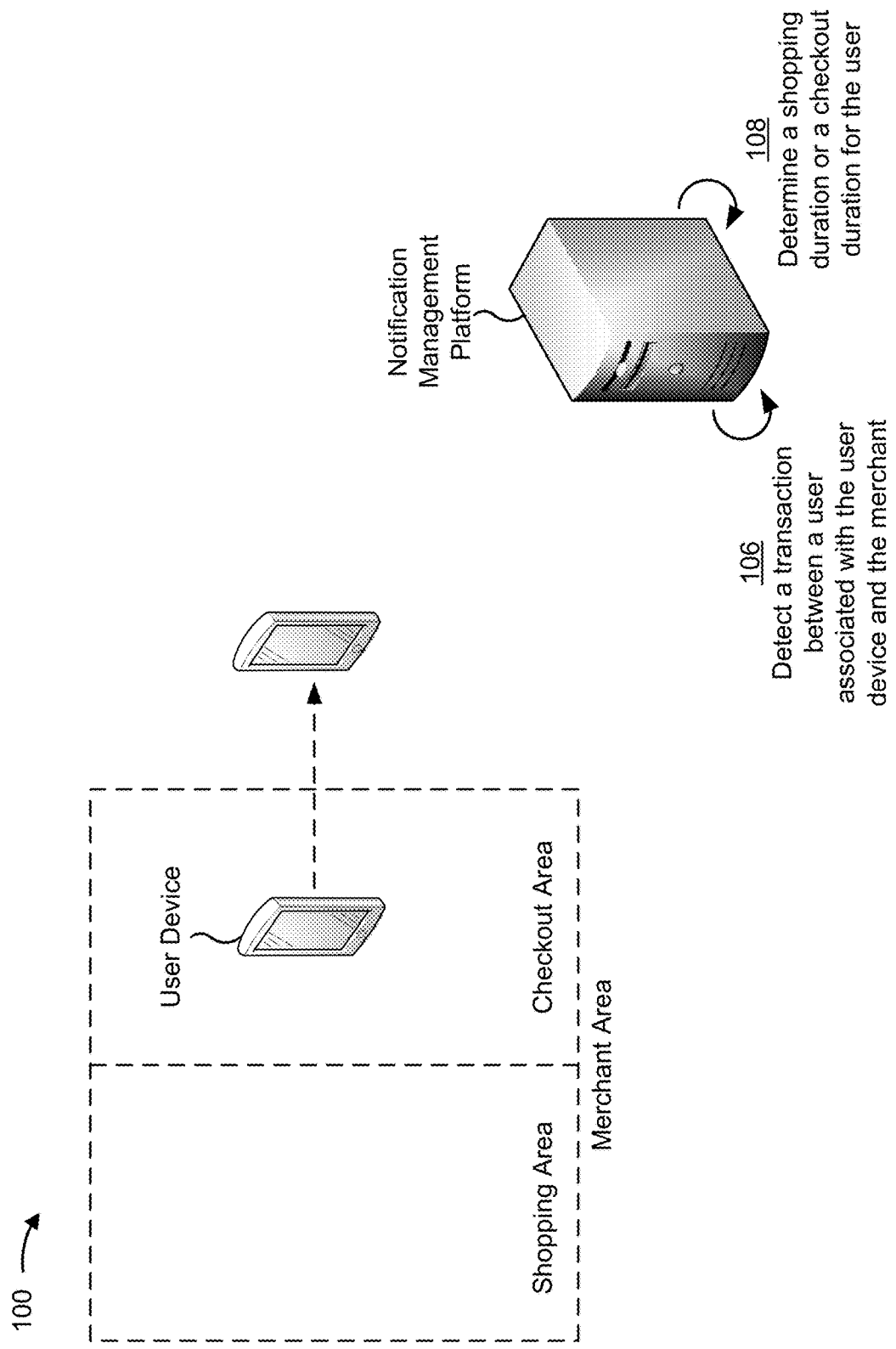

As shown in FIG. 1B, and by reference number 106, the notification management platform may detect a transaction between the user and the merchant. When a transaction is performed with a transaction card, a transaction device (e.g., a point-of-sale terminal) of the merchant may transmit transaction data associated with the transaction (e.g., a merchant account associated with the transaction, a user account associated with the transaction, an amount of the transaction, a time of the transaction, and/or the like) to a payment gateway system (e.g., a payment gateway system associated with the notification management platform). Thus, the notification management platform may detect a transaction associated with a transaction card of the user by monitoring a transaction stream (e.g., an updating, chronological list of transactions processed by the payment gateway system) associated with the merchant. Transactions of the transaction stream may be associated with transaction times. Thus, the notification management platform may determine a transaction time of a transaction that is detected based on the transaction stream.

In some implementations, the notification management platform may determine that the user device exited the merchant area without the user participating in a transaction with the merchant (e.g., based on the transaction stream lacking a transaction associated with the user within a threshold time period prior to the user device exiting the merchant area). An exit of the user device from the merchant area may be associated with an exit time (e.g., based on the time data associated with the location data).

In some implementations, a transaction involving the user and the merchant may provide a trigger for the notification management platform to obtain location data from the user device. For example, upon detecting the transaction, the notification management platform may determine that the user was, or is, at the merchant area, and obtain historical location data from the user device over a particular time period (e.g., an hour prior to the transaction, 2 hours prior to the transaction, and/or the like). In such a case, the user device may store location data for a particular time period (e.g., 24 hours, 1 week, 1 month, and/or the like). The notification management platform may use the historical location data to determine an entry of the user device into the merchant area (and an associated entry time), a transition of the user device from the shopping area to the checkout area (and an associated transition time), and/or the like. In this way, the notification management platform may obtain and process location data as needed, rather than constantly, thereby better protecting privacy of the user's location data and conserving resources (e.g., processor resources, memory resources, network resources, and/or the like) that would otherwise be used if the location data were constantly obtained and processed.

As shown by reference number 108, the notification management platform may determine a shopping duration and/or a checkout duration associated with the user. For example, the notification management platform may determine the shopping duration and/or the checkout duration based on the location data generated by the user device and/or the transaction data generated by the transaction device of the merchant. By using data generated by the user device and the transaction device, the notification management platform provides location tracking of the user device with improved precision.

The notification management platform may determine the shopping duration and/or the checkout duration based on the entry time, the transition time, the transaction time, the exit time, and/or the like that is associated with the user. For example, the notification management platform may determine the shopping duration based on the entry time and the transition time (e.g., based on a difference between the entry time and the transition time). As another example, the notification management platform may determine the checkout duration based on the transition time and the transaction time (e.g., based on a difference between the transition time and the transaction time). In some implementations, the notification management platform may determine a total duration that the user spent in the merchant area based on the shopping duration and/or the checkout duration and/or based on the entry time and the exit time (e.g., based on a difference between the entry time and the exit time). The shopping duration, the checkout duration, and/or the total duration may be associated with an indication of whether the user participated in a transaction with the merchant (e.g., based on whether the notification management platform detected a transaction involving the user and the merchant).

In some implementations, the notification management platform may determine a plurality of shopping durations, checkout durations, and/or total durations associated with a plurality of users, which the notification management platform may use to determine aggregate (e.g., average) shopping durations, checkout durations, and/or total durations. The aggregate shopping durations, checkout durations, and/or total durations may relate to current durations associated with the merchant area (e.g., over a prior 10 minutes, 30 minutes, and/or the like). Additionally, or alternatively, the aggregate shopping durations, checkout durations, and/or total durations may relate to historical durations associated with the merchant area in connection with a particular time period (e.g., an hour, a day, a week, a month, and/or the like). For example, the notification management platform may determine an average shopping duration, checkout duration, and/or total duration relating to Saturdays, relating to 12 p.m.-1 p.m., relating to the month of December, and/or the like.

The notification management platform (e.g., using a machine learning model in a manner similar to that described above) may use the aggregate shopping durations, checkout durations, and/or total durations, as well as associated data relating to transactions, to determine particular shopping durations, particular checkout durations, and/or particular total durations that indicate particular user behavior. For example, the notification management platform may determine that a particular shopping duration (e.g., a relatively short shopping duration) indicates that users have minimal interest in goods or services offered by a merchant. As another example, the notification management platform may determine that a particular shopping duration (e.g., a relatively long shopping duration) indicates that users are unable to locate items of interest. As a further example, the notification management platform may determine that a particular checkout duration (e.g., a relatively long checkout duration) results in users exiting the store without making a purchase.

Figure 1C:
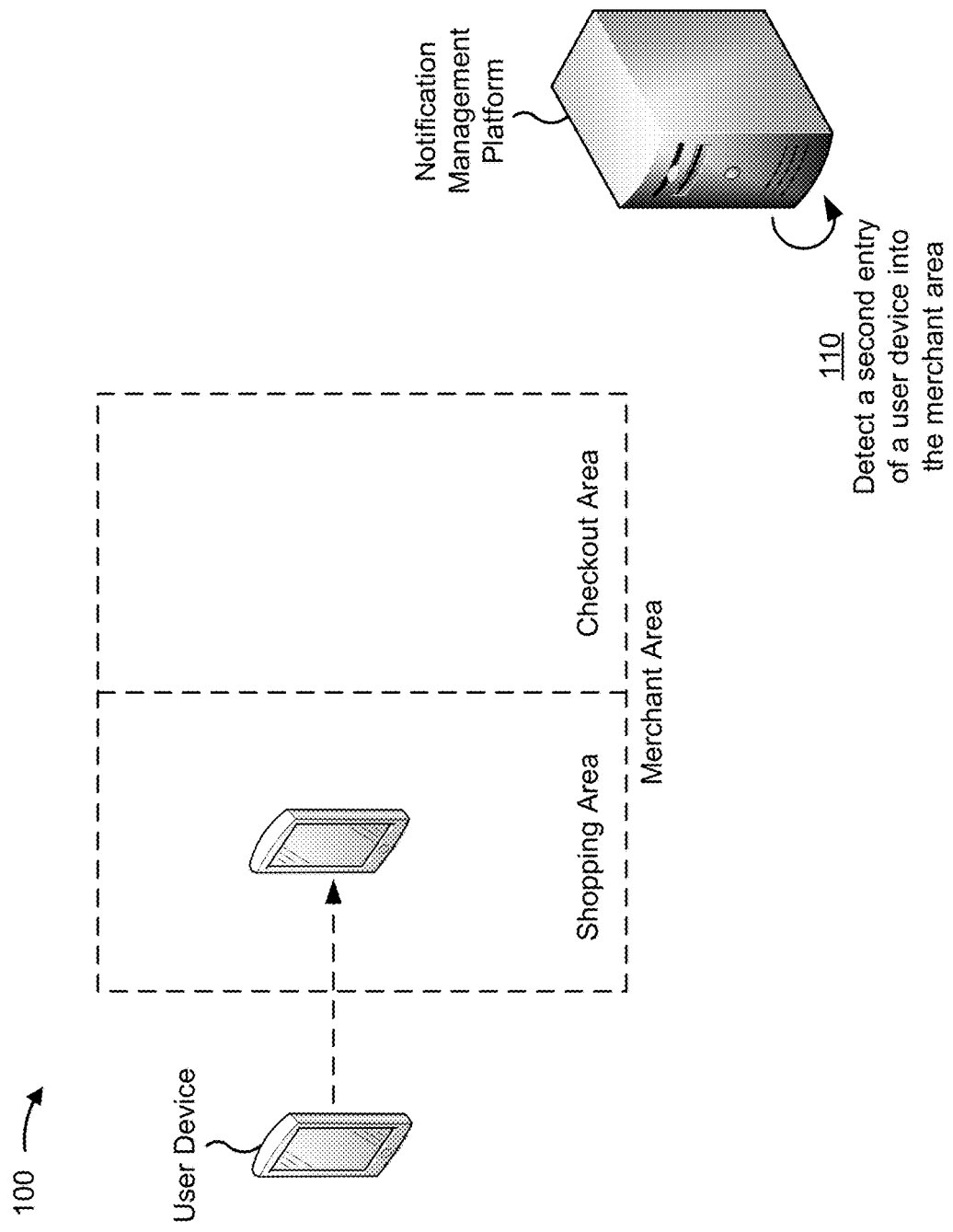

As shown in FIG. 1C, and by reference number 110, the notification management platform may detect a second entry of a user device into the merchant area. The second entry may be associated with a second user device of a second user. The second user may be associated with the first user (e.g., the first user may have elected to share information with the second user). In some implementations, the second entry may be associated with the first user device of the first user. For example, the second entry may be associated with the first user returning to the merchant area after a previous interaction with the merchant area.

Figure 1D:
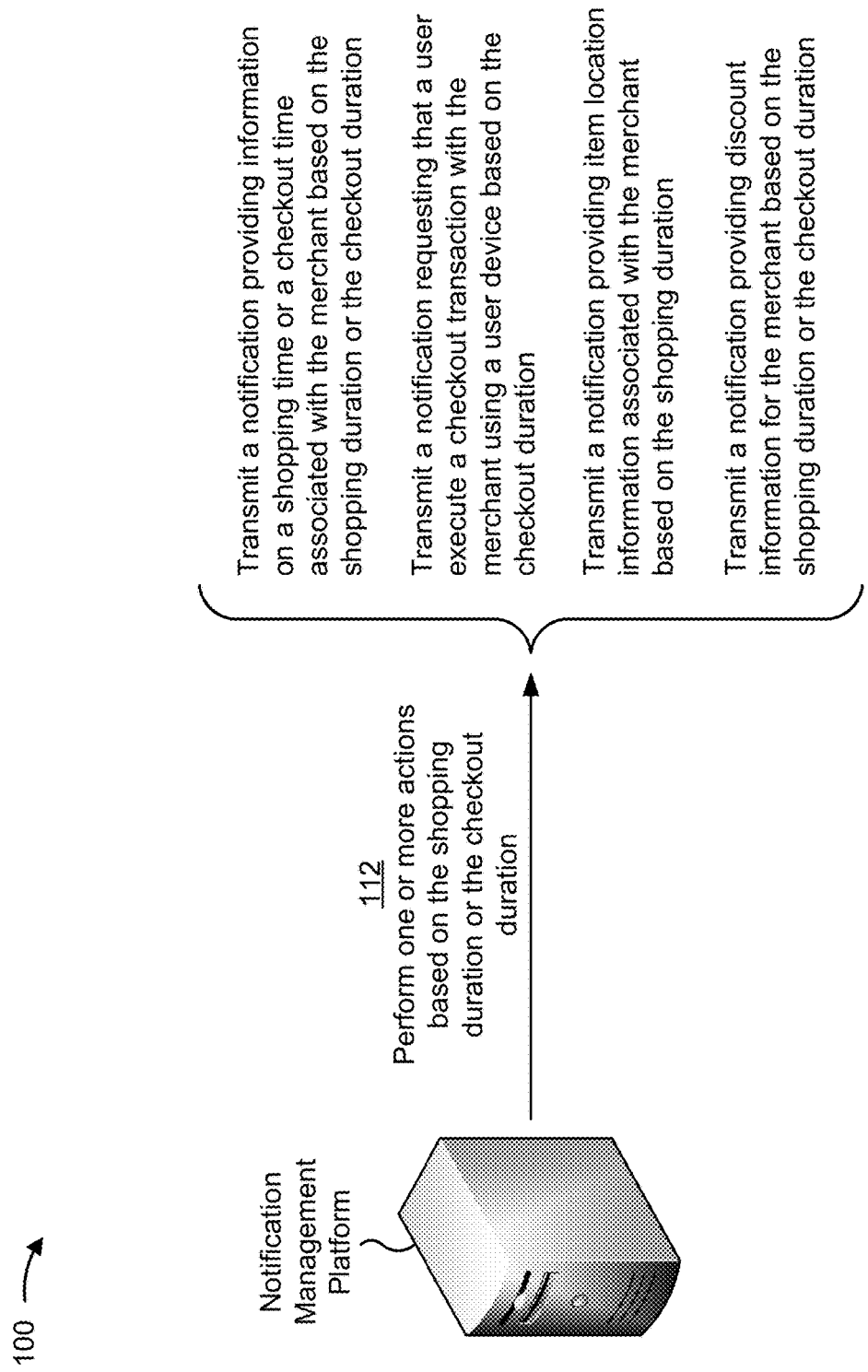

As shown in FIG. 1D, and by reference number 112, the notification management platform may perform one or more actions. In some implementations, the one or more actions may relate to transmitting a notification. For example, the notification management platform may determine whether to transmit a notification to the second user device, when to transmit the notification to the second user device, and/or a type of notification to transmit to the second user device based on a shopping duration, a checkout duration, and/or a total duration associated with the first user and/or a plurality of users. As another example, the notification management platform may determine whether to transmit a notification to the first user device, when to transmit the notification to the first user device, and/or a type of notification to transmit to the first user device based on a shopping duration, a checkout duration, and/or a total duration associated with the first user (e.g., associated with a previous interaction of the first user with the merchant area) and/or a plurality of users.

In some implementations, the notification management platform may transmit a notification to a user device providing information on a shopping duration and/or a checkout duration associated with the merchant. For example, the notification management platform may determine a shopping duration (e.g., based on one or more users) and/or a checkout duration (e.g., based on one or more users), and transmit a notification to a user device providing information relating to the shopping duration and/or the checkout duration upon detecting an entry of the user device into the merchant area.

In some implementations, the notification management platform may transmit a notification to a user device based on whether a shopping duration associated with the merchant satisfies a threshold range (e.g., the shopping duration is shorter or longer than a desired range) and/or a checkout duration associated with the merchant satisfies a threshold range (e.g., the checkout duration is longer than a desired range). For example, the notification management platform may determine that a shopping duration does not satisfy a threshold range (e.g., the shopping duration is shorter than a desired range) and/or that a checkout duration does not satisfy a threshold range (e.g., the checkout duration is longer than a desired range), and transmit a notification to a user device that provides discount information (e.g., a coupon) upon detecting an entry of the user device into the merchant area.

As another example, the notification management platform may determine that a checkout duration does not satisfy a threshold range (e.g., the checkout duration is longer than a desired range), and transmit a notification to a user device requesting that a user make a purchase with the merchant using the user device (e.g., make a purchase through a website of the merchant, through a smartphone application of the merchant, and/or the like) upon detecting an entry of the user device into the merchant area. As a further example, the notification management platform may determine that a shopping duration does not satisfy a threshold range (e.g., the shopping duration is longer than a desired range), and transmit a notification to a user device providing a map of the merchant area, item location information, and/or the like upon detecting an entry of the user device into the merchant area.

As an additional example, the notification management platform may determine that a shopping duration does not satisfy a threshold range (e.g., the shopping duration is shorter than a desired range) and/or that a checkout duration does not satisfy a threshold range (e.g., the checkout duration is longer than a desired range) and generate a sale for the merchant. For example, the notification management platform may determine one or more items to place on sale, an amount of a discount relating to the sale, a time period for the sale, and/or the like based on a degree by which the shopping duration does not satisfy the threshold range and/or the checkout duration does not satisfy the threshold range. The notification management platform may transmit a notification to a user device providing information relating to the sale upon detecting an entry of the user device into the merchant area.

In some implementations, the notification management platform may determine to transmit a notification (e.g., a notification as described above) to a user device without detecting an entry of the user device into the merchant area. For example, the notification management platform may determine to transmit a notification to a user device based on an association between a user of the user device and the merchant. The association may be a result of a previous transaction of the user with the merchant, a previous entry of the user device into the merchant area, and/or the like. As another example, the notification management platform may determine to a transmit a notification to the second user device based on an association between the second user and the first user. The association may be a result of the first user electing to share information with the second user. Accordingly, the notification management platform may transmit a notification to the second user device relating to a shopping duration and/or a checkout duration of the first user based on the association and without detecting an entry of the second user device into the merchant area.

The notification management platform also may transmit a notification to a user device (e.g., without detecting an entry of the user device into the merchant area) that provides a recommendation of the merchant. For example, based on a shopping duration for a merchant satisfying a threshold range and/or a checkout duration for a merchant satisfying a threshold range (e.g., thereby indicating good service, good atmosphere, a simple store layout, fast checkout, and/or the like), the notification management platform may transmit a notification to a user device that provides a recommendation of the merchant.

In some implementations, the notification management platform may determine not to transmit a notification to a user device, based on whether a shopping duration associated with the merchant satisfies a threshold range and/or a checkout duration associated with the merchant satisfies a threshold range. For example, the notification management platform may determine that a shopping duration satisfies a threshold range and/or a checkout duration satisfies a threshold range (e.g., which may indicate a satisfactory user experience) and determine not to transmit a notification to a user device upon detecting an entry of the user device into the merchant area. In this way, the notification management platform is able to conserve resources (e.g., processor resources, memory resources, network resources, and/or the like) that may otherwise be wasted transmitting unnecessary notifications.

In some implementations, upon detecting a second entry of a user device into the merchant area, the notification management platform may monitor a movement of the user device to determine whether the user device is within the shopping area of the merchant area or the checkout area of the merchant area. The notification management platform may transmit a notification to the user device based on a shopping duration and/or a checkout duration and further based on whether the user device is within the shopping area or the checkout area. For example, the notification management platform may determine that a checkout duration does not satisfy a threshold range (e.g., the checkout duration is longer than a desired range), but determine not to transmit a notification to the user device because the user device is within the checkout area.

In some implementations, the notification management platform may transmit a notification to the second user device providing information relating to a location, a status, a behavior, and/or the like of the first user (e.g., when the first user has elected to share information with the second user). For example, after detecting an entry of the first user device into a merchant area (e.g., a restaurant, a bar, and/or the like), and based on a historical shopping duration (e.g., an average historical shopping duration) of the first user (or a plurality of users) in connection with the merchant area, the notification management platform may determine to transmit a notification to the second user device identifying that the first user is present at the merchant area (e.g., if the historical shopping duration satisfies a threshold value indicating an amount of time sufficient to permit the second user to travel to the merchant area). In such a case, the notification management platform may transmit the notification to the second user device upon detecting an entry of the second user device into the merchant area, detecting an entry of the second user device into a building that includes the merchant area, detecting an entry of the second user device into a district that includes the merchant area, and/or the like.

In some implementations, the notification management platform may transmit a notification to a user device based on detecting that the user device has exited the merchant area. In one such case, the notification management platform may transmit the notification based on detecting that the user device has exited the merchant area and determining that a user associated with the user device did not participate in a transaction with the merchant. For example, after detecting that the user device has exited the merchant area, the notification management platform may process a transaction stream associated with the merchant to determine whether the transaction stream includes a transaction associated with the user (e.g., a recent transaction, such as within a prior 30 seconds, a prior minute, and/or the like). Based on determining that the user did not participate in a transaction with the merchant, the notification management platform may transmit a notification to the user device (e.g., providing discount information, item location information, and/or the like).

As indicated above, FIGS. 1A-1D are provided as one or more examples. Other examples may differ from what is described with regard to FIGS. 1A-1D.

Figure 2:
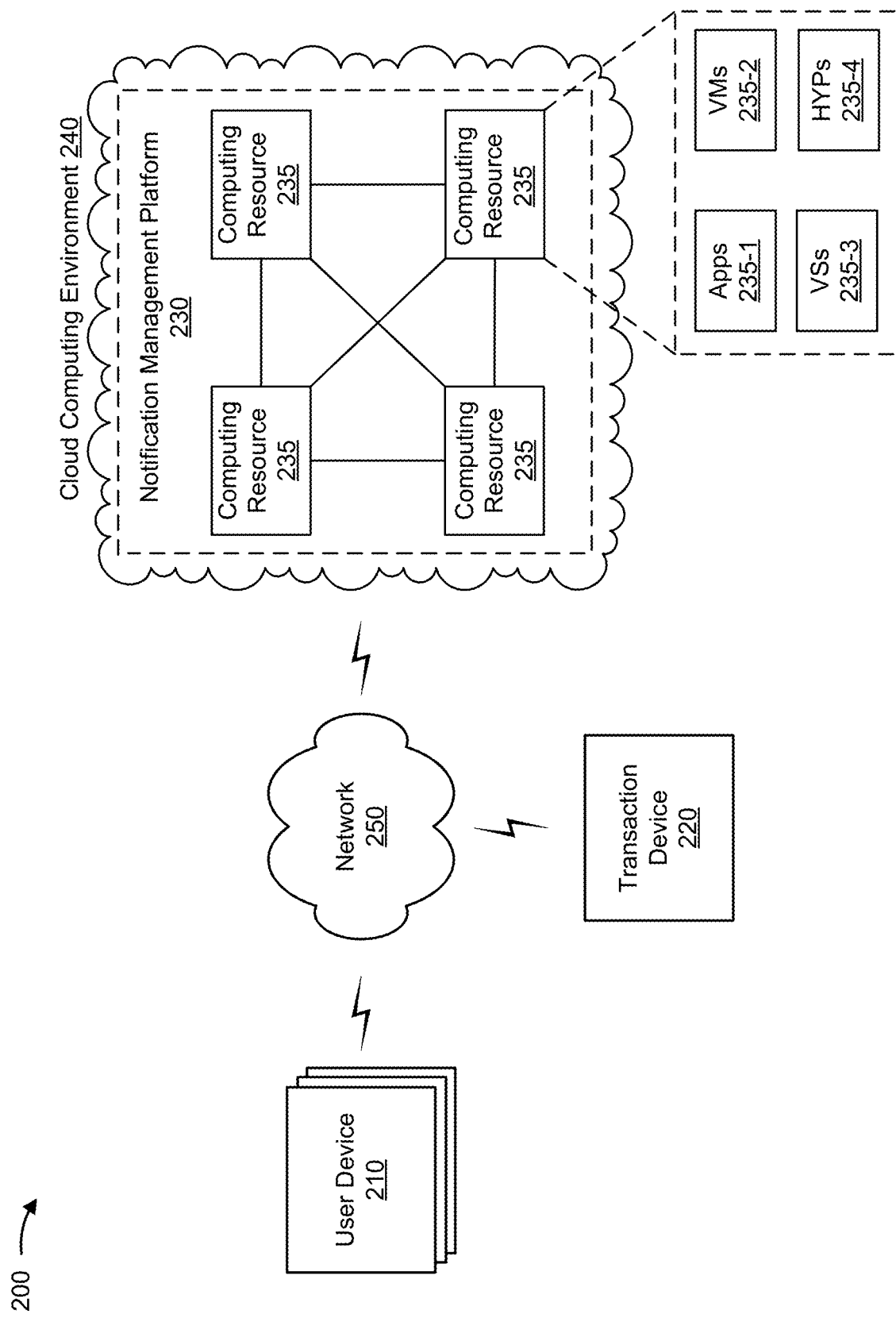
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a transaction device 220, a notification management platform 230, a computing resource 235, a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing information associated with providing location data and/or receiving notifications. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Transaction device 220 includes one or more devices capable of receiving, generating, storing, processing, and/or providing information, such as information described herein. For example, transaction device 220 may include an automated teller machine (ATM) device, a point of sale (POS) device, a kiosk device, and/or the like. An ATM device may include an electronic telecommunications device that enables customers of financial institutions to perform financial transactions, such as cash withdrawals, deposits, transferring funds, obtaining account information, and/or the like, at any time and without direct interaction with employees of the financial institutions. A POS device may include an electronic device used to process transaction card payments at retail locations. The POS device may read information from a transaction card (e.g., a credit card, a debit card, a gift card, and/or the like), and may determine whether there are sufficient funds in an account associated with the transaction card for a transaction. The POS device may transfer funds from the account associated with the transaction card to an account of a retailer and may record the transaction. A kiosk device may include a computer terminal featuring specialized hardware and software that provides access to information and/or applications for communication, commerce, entertainment, education, and/or the like.

Notification management platform 230 includes one or more computing resources assigned to track a location of a user device and transmit notifications. For example, notification management platform 230 may be a platform implemented by cloud computing environment 240 that may detect whether a user device entered or exited a merchant area, detect a transition of the user device from a shopping area to a checkout area, detect a transaction associated with the merchant, determine a shopping duration and/or a checkout duration, transmit a notification based on the shopping duration and/or the checkout duration, and/or the like. In some implementations, notification management platform 230 is implemented by computing resources 235 of cloud computing environment 240.

Notification management platform 230 may include a server device or a group of server devices. In some implementations, notification management platform 230 may be hosted in cloud computing environment 240. Notably, while implementations described herein may describe notification management platform 230 as being hosted in cloud computing environment 240, in some implementations, notification management platform 230 may be non-cloud-based or may be partially cloud-based.

Cloud computing environment 240 includes an environment that delivers computing as a service, whereby shared resources, services, and/or the like may be provided to user device 210, transaction device 220, and/or the like. Cloud computing environment 240 may provide computation, software, data access, storage, and/or other services that do not require end-user knowledge of a physical location and configuration of a system and/or a device that delivers the services. As shown, cloud computing environment 240 may include notification management platform 230 and computing resource 235.

Computing resource 235 includes one or more personal computers, workstation computers, server devices, or another type of computation and/or communication device. In some implementations, computing resource 235 may host notification management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210, transaction device 220, and/or the like. Application 235-1 may eliminate a need to install and execute the software applications on user device 210, transaction device 220, and/or the like. For example, application 235-1 may include software associated with notification management platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of a user, and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
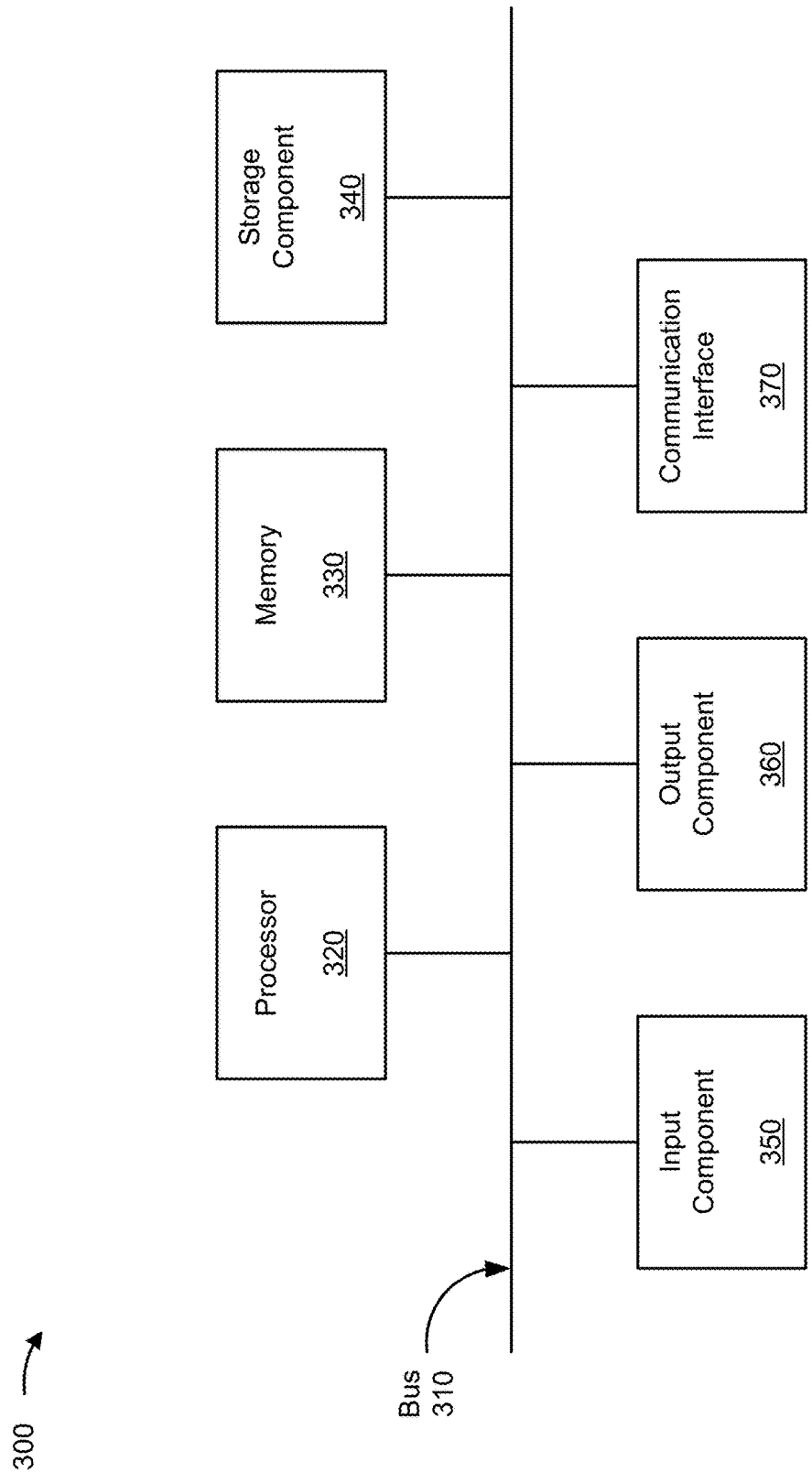
FIG. 3 is a diagram of example components of one or more devices of FIG. 2.

FIG. 3 is a diagram of example components of a device 300. Device 300 may correspond to user device 210, transaction device 220, notification management platform 230, and/or computing resources 235. In some implementations, user device 210, transaction device 220, notification management platform 230, and/or computing resources 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
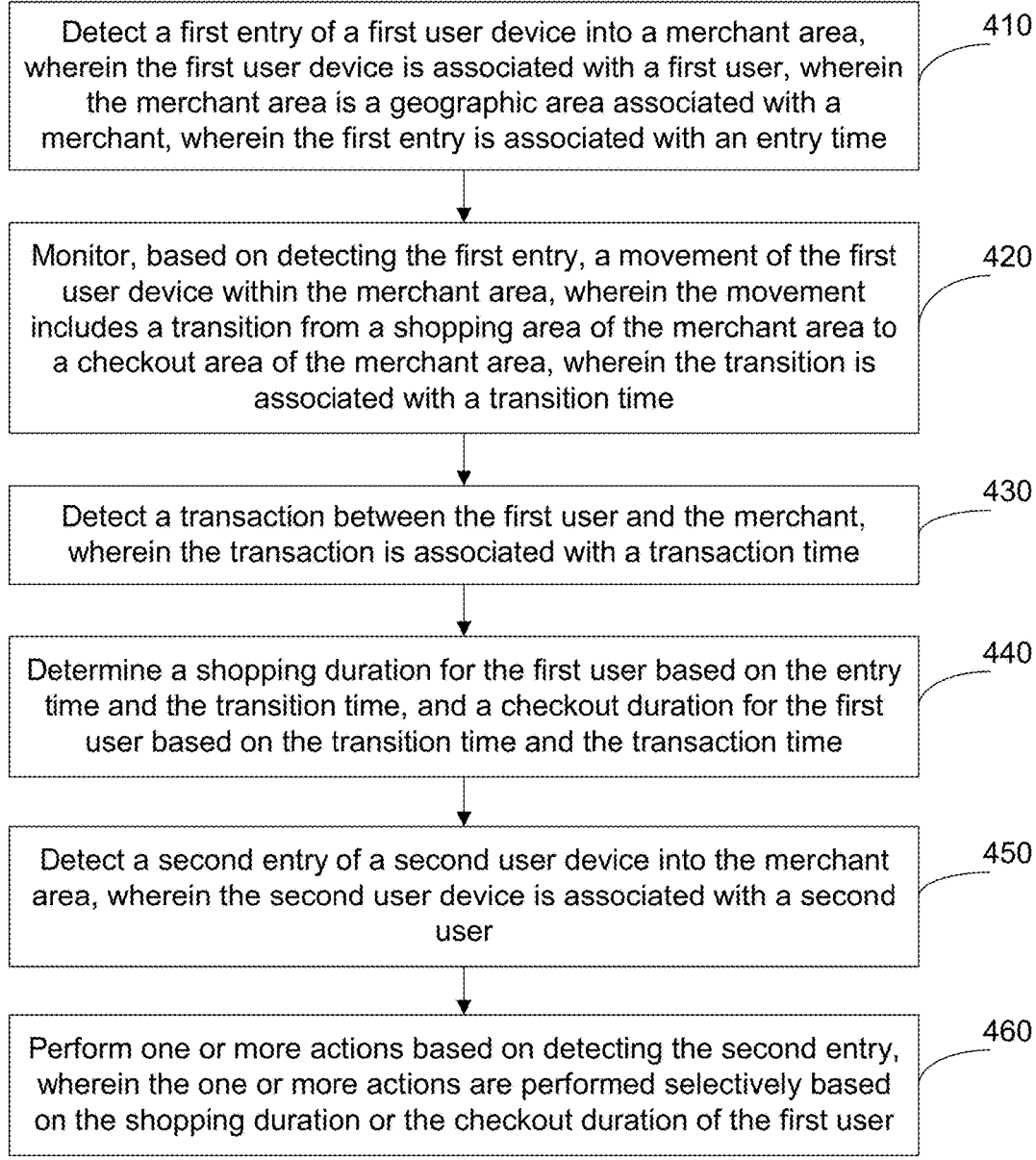
FIGS. 4-6 are flow charts of example processes for determining shopping duration based on a movement of a user device and transaction data.

FIG. 4 is a flow chart of an example process 400 for determining shopping duration based on a movement of a user device and transaction data. In some implementations, one or more process blocks of FIG. 4 may be performed by a notification management platform (e.g., notification management platform 230). In some implementations, one or more process blocks of FIG. 4 may be performed by another device or a group of devices separate from or including the notification management platform, such as a user device (e.g., user device 210), a transaction device (e.g., transaction device 220), and/or the like.

As shown in FIG. 4, process 400 may include detecting a first entry of a first user device into a merchant area, wherein the first user device is associated with a first user, wherein the merchant area is a geographic area associated with a merchant, and wherein the first entry is associated with an entry time (block 410). For example, the notification management platform (e.g., using processor 320, memory 330, storage component 340, input component 350, communication interface 370, and/or the like) may detect a first entry of a first user device into a merchant area, as described above. In some implementations, the first user device may be associated with a first user. In some implementations, the merchant area may be a geographic area associated with a merchant. In some implementations, the first entry may be associated with an entry time.

As further shown in FIG. 4, process 400 may include monitoring, based on detecting the first entry, a movement of the first user device within the merchant area, wherein the movement includes a transition from a shopping area of the merchant area to a checkout area of the merchant area, and wherein the transition is associated with a transition time (block 420). For example, the notification management platform (e.g., using processor 320, memory 330, storage component 340, and/or the like) may monitor, based on detecting the first entry, a movement of the first user device within the merchant area, as described above. In some implementations, the movement may include a transition from a shopping area of the merchant area to a checkout area of the merchant area. In some implementations, the transition may be associated with a transition time.

As further shown in FIG. 4, process 400 may include detecting a transaction between the first user and the merchant, wherein the transaction is associated with a transaction time (block 430). For example, the notification management platform (e.g., using processor 320, memory 330, storage component 340, input component 350, communication interface 370, and/or the like) may detect a transaction between the first user and the merchant, as described above. In some implementations, the transaction may be associated with a transaction time.

As further shown in FIG. 4, process 400 may include determining a shopping duration for the first user based on the entry time and the transition time, and a checkout duration for the first user based on the transition time and the transaction time (block 440). For example, the notification management platform (e.g., using processor 320, memory 330, storage component 340, and/or the like) may determine a shopping duration for the first user based on the entry time and the transition time, and a checkout duration for the first user based on the transition time and the transaction time, as described above.

As further shown in FIG. 4, process 400 may include detecting a second entry of a second user device into the merchant area, wherein the second user device is associated with a second user (block 450). For example, the notification management platform (e.g., using processor 320, memory 330, storage component 340, input component 350, communication interface 370, and/or the like) may detect a second entry of a second user device into the merchant area, as described above. In some implementations, the second user device is associated with a second user.

As further shown in FIG. 4, process 400 may include performing one or more actions based on detecting the second entry, wherein the one or more actions are performed selectively based on one or more of the shopping duration or the checkout duration of the first user (block 460). For example, the notification management platform (e.g., using processor 320, memory 330, storage component 340, output component 360, communication interface 370, and/or the like) may perform one or more actions based on detecting the second entry, as described above. In some implementations, the one or more actions may be performed selectively based on the shopping duration or the checkout duration of the first user.

Process 400 may include additional implementations, such as any single implementation or any combination of implementations described below and/or in connection with one or more other processes described elsewhere herein.

In a first implementation, performing the one or more actions may include transmitting a notification to the second user device that relates to one or more of: providing information on a shopping time or a checkout time associated with the merchant based on the shopping duration or the checkout duration; requesting that the second user execute a checkout transaction with the merchant using the second user device based on the checkout duration; providing item location information associated with the merchant based on the shopping duration; or providing discount information for the merchant based on the shopping duration or the checkout duration. In a second implementation, alone or in combination with the first implementation, performing the one or more actions may include generating sale information for the merchant, where the sale information is based on the shopping duration or the checkout duration.

In a third implementation, alone or in combination with one or more of the first and second implementations, detecting the first entry or detecting the second entry may be based on GPS coordinates associated with the merchant area. In a fourth implementation, alone or in combination with one or more of the first through third implementations, the first user may have elected to share information with the second user, and the notification management platform may transmit a notification to the second user device indicating a location of the first user at the merchant based on the first user having elected to share the information with the second user.

In a fifth implementation, alone or in combination with one or more of the first through fourth implementations, the movement may be a first movement, and the notification management platform may monitor, based on detecting the second entry, a second movement of the second user device within the merchant area. The notification management platform may perform one or more additional actions based on the shopping duration or the checkout duration and based on whether the second movement is within the shopping area of the merchant area or the checkout area of the merchant area. In a sixth implementation, alone or in combination with one or more of the first through fifth implementations, the second movement may be within the shopping area of the merchant area, and the notification management platform, when performing the one or more additional actions, may transmit a notification to the second user device providing discount information for the merchant based on the shopping duration or the checkout duration.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
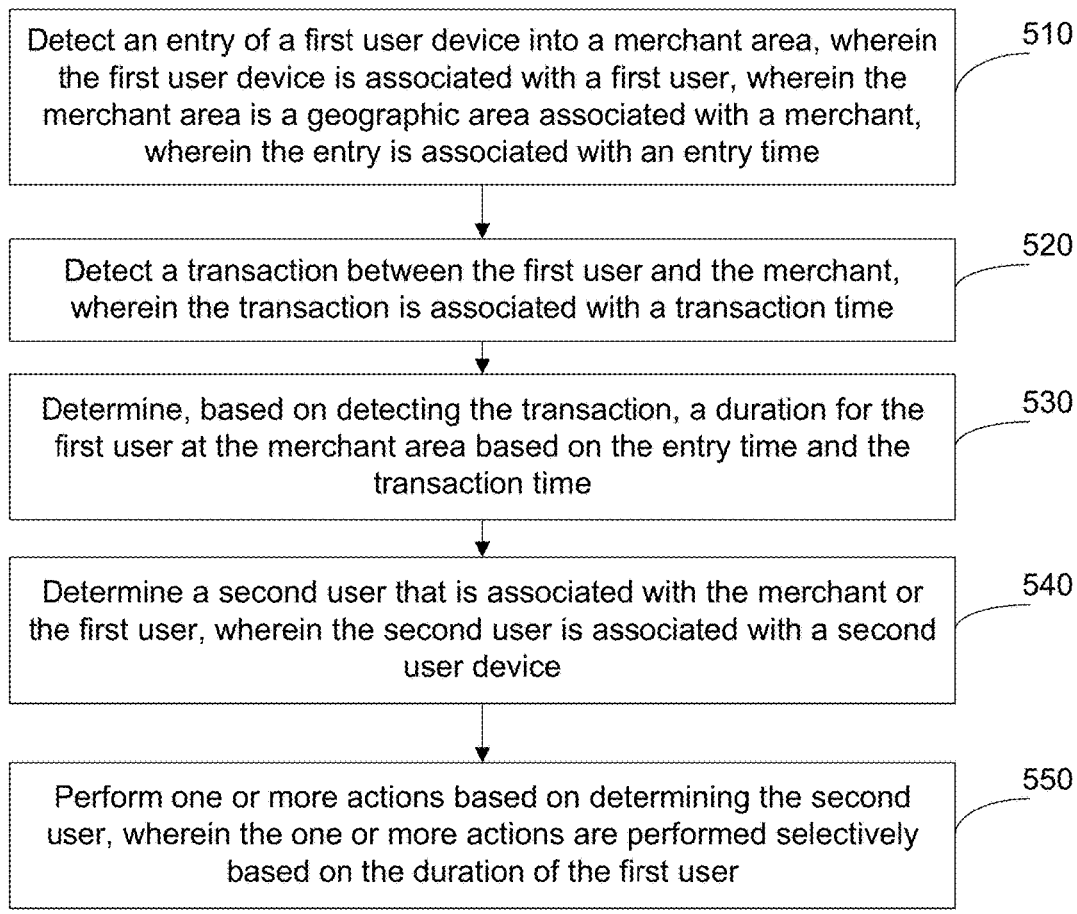

FIG. 5 is a flow chart of an example process 500 for determining duration at a merchant area based on a movement of a user device and transaction data. In some implementations, one or more process blocks of FIG. 5 may be performed by a notification management platform (e.g., notification management platform 230). In some implementations, one or more process blocks of FIG. 5 may be performed by another device or a group of devices separate from or including the notification management platform, such as user device 210, transaction device 220, and/or the like.

As shown in FIG. 5, process 500 may include detecting an entry of a first user device into a merchant area, wherein the first user device is associated with a first user, wherein the merchant area is a geographic area associated with a merchant, and wherein the entry is associated with an entry time (block 510). For example, the notification management platform (e.g., using processor 320, memory 330, storage component 340, input component 350, communication interface 370, and/or the like) may detect an entry of a first user device into a merchant area, as described above. In some implementations, the first user device may be associated with a first user. In some implementations, the merchant area may be a geographic area associated with a merchant. In some implementations, the entry may be associated with an entry time.

As further shown in FIG. 5, process 500 may include detecting a transaction between the first user and the merchant, wherein the transaction is associated with a transaction time (block 520). For example, the notification management platform (e.g., using processor 320, memory 330, storage component 340, and/or the like) may detect a transaction between the first user and the merchant, as described above. In some implementations, the transaction may be associated with a transaction time.

As further shown in FIG. 5, process 500 may include determining, based on detecting the transaction, a duration for the first user at the merchant based on the entry time and the transaction time (block 530). For example, the notification management platform (e.g., using processor 320, memory 330, storage component 340, and/or the like) may determine, based on detecting the transaction, a duration for the first user at the merchant based on the entry time and the transaction time, as described above.

As further shown in FIG. 5, process 500 may include determining a second user that is associated with the merchant or the first user, wherein the second user is associated with a second user device (block 540). For example, the notification management platform (e.g., using processor 320, memory 330, storage component 340, and/or the like) may determine a second user that is associated with the merchant or the first user, as described above. In some implementations, the second user may be associated with a second user device.

As further shown in FIG. 5, process 500 may include performing one or more actions based on determining the second user, wherein the one or more actions are performed selectively based on the duration of the first user (block 550). For example, the notification management platform (e.g., using processor 320, memory 330, storage component 340, output component 360, communication interface 370, and/or the like) may perform one or more actions based on determining the second user, as described above. In some implementations, the one or more actions may be performed selectively based on the duration of the first user.

Process 500 may include additional implementations, such as any single implementation or any combination of implementations described below and/or in connection with one or more other processes described elsewhere herein.

In a first implementation, the notification management platform, when performing the one or more actions, may transmit a notification to the second user device that relates to one or more of: providing information on the duration and the merchant; providing item location information associated with the merchant based on the duration; or providing discount information for the merchant based on the duration.

In a second implementation, alone or in combination with the first implementation, the entry may be a first entry, and the notification management platform, when determining the second user, may determine that the second user is associated with the merchant based on detecting a second entry of the second user device into the merchant area. In a third implementation, alone or in combination with one or more of the first and second implementations, the notification management platform, when determining the second user, may determine that the second user is associated with the merchant based on a previous transaction of the second user with the merchant. In a fourth implementation, alone or in combination with one or more of the first through third implementations, the notification management platform, when determining the second user, may determine that the second user is associated with the merchant and the first user. The second user may be associated with the first user based on an election by the first user to share information with the second user.

In a fifth implementation, alone or in combination with one or more of the first through fourth implementations, the notification management platform, when performing the one or more actions, may determine whether the duration is less than an average duration associated with the first user at the merchant, and transmit a notification to the second user device providing information that indicates a location of the first user at the merchant based on determining that the duration is less than the average duration. In a sixth implementation, the notification management platform, when performing the one or more actions, may transmit a notification to the second user device providing a recommendation for the second user to visit the merchant based on the duration satisfying a threshold value.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
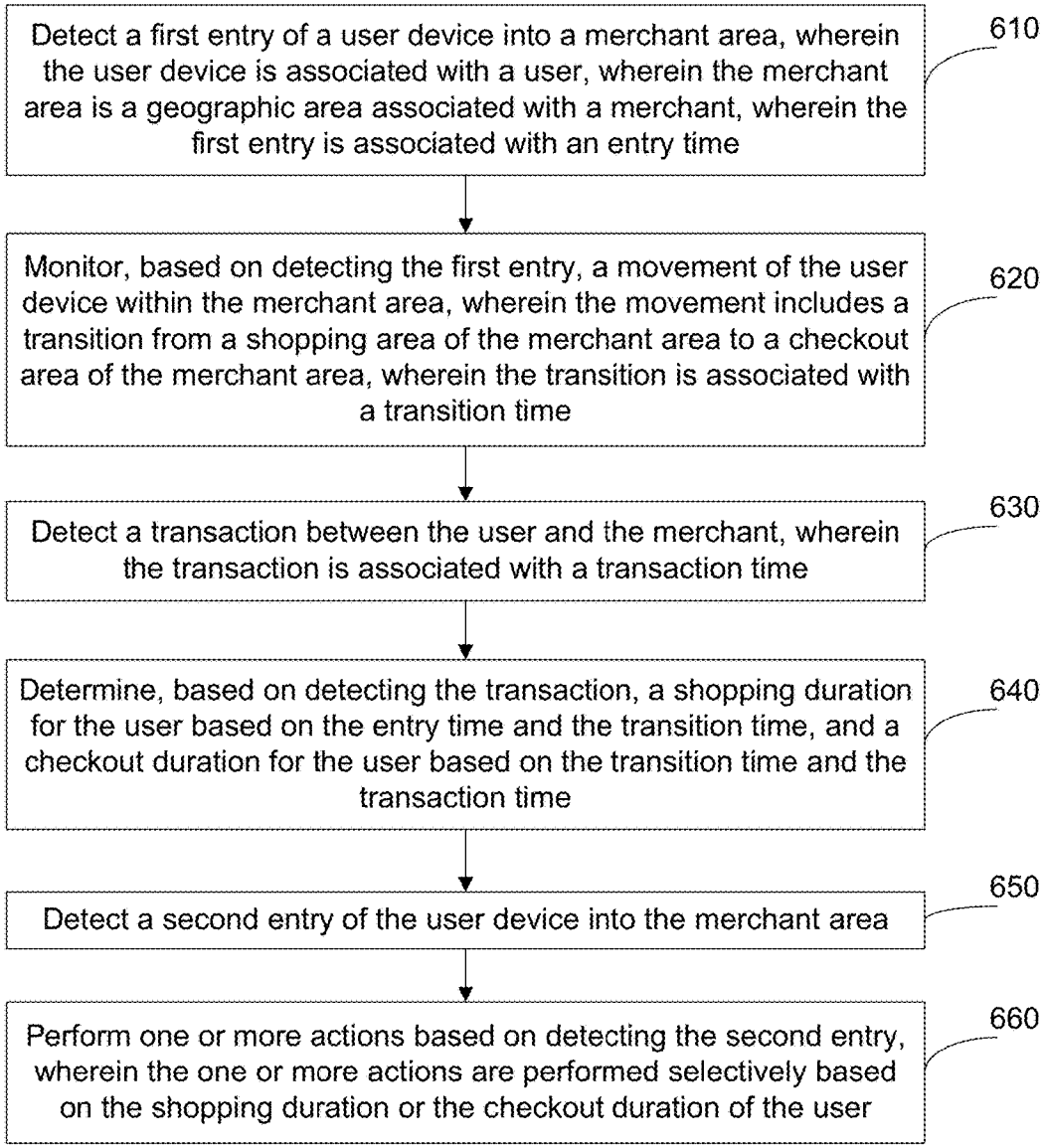

FIG. 6 is a flow chart of an example process 600 for determining shopping duration based on a movement of a user device and transaction data. In some implementations, one or more process blocks of FIG. 6 may be performed by a notification management platform (e.g., notification management platform 230). In some implementations, one or more process blocks of FIG. 6 may be performed by another device or a group of devices separate from or including the notification management platform, such as a user device (e.g., user device 210), a transaction device (e.g., transaction device 220), and/or the like.

As shown in FIG. 6, process 600 may include detecting a first entry of a user device into a merchant area, wherein the user device is associated with a user, wherein the merchant area is a geographic area associated with a merchant, and wherein the first entry is associated with an entry time (block 610). For example, the notification management platform (e.g., using processor 320, memory 330, storage component 340, input component 350, communication interface 370, and/or the like) may detect a first entry of a user device into a merchant area, as described above. In some implementations, the user device may be associated with a user. In some implementations, the merchant area may be a geographic area associated with a merchant. In some implementations, the first entry may be associated with an entry time.

As further shown in FIG. 6, process 600 may include monitoring, based on detecting the first entry, a movement of the user device within the merchant area, wherein the movement includes a transition from a shopping area of the merchant area to a checkout area of the merchant area, and wherein the transition is associated with a transition time (block 620). For example, the notification management platform (e.g., using processor 320, memory 330, storage component 340, input component 350, communication interface 370, and/or the like) may monitor, based on detecting the first entry, a movement of the user device within the merchant area, as described above. In some implementations, the movement may include a transition from a shopping area of the merchant area to a checkout area of the merchant area. In some implementations, the transition may be associated with a transition time.

As further shown in FIG. 6, process 600 may include detecting a transaction between the user and the merchant, wherein the transaction is associated with a transaction time (block 630). For example, the notification management platform (e.g., using processor 320, memory 330, storage component 340, input component 350, communication interface 370, and/or the like) may detect a transaction between the user and the merchant, as described above. In some implementations, the transaction may be associated with a transaction time.

As further shown in FIG. 6, process 600 may include determining, based on detecting the transaction, a shopping duration for the user based on the entry time and the transition time, and a checkout duration for the user based on the transition time and the transaction time (block 640). For example, the notification management platform (e.g., using processor 320, memory 330, storage component 340, and/or the like) may determine, based on detecting the transaction, a shopping duration for the user based on the entry time and the transition time, and a checkout duration for the user based on the transition time and the transaction time, as described above.

As further shown in FIG. 6, process 600 may include detecting a second entry of the user device into the merchant area (block 650). For example, the notification management platform (e.g., using processor 320, memory 330, storage component 340, input component 350, communication interface 370, and/or the like) may detect a second entry of the user device into the merchant area, as described above.

As further shown in FIG. 6, process 600 may include performing one or more actions based on detecting the second entry, wherein the one or more actions are performed selectively based on the shopping duration or the checkout duration of the user (block 660). For example, the notification management platform (e.g., using processor 320, memory 330, storage component 340, output component 360, communication interface 370, and/or the like) may perform one or more actions based on detecting the second entry, as described above. In some implementations, the one or more actions may be performed selectively based on the shopping duration or the checkout duration of the user.

Process 600 may include additional implementations, such as any single implementation or any combination of implementations described below and/or in connection with one or more other processes described elsewhere herein.

In a first implementation, the notification management platform, when performing the one or more actions, may transmit a notification to the user device that relates to one or more of: providing information on the shopping duration or the checkout duration; requesting that the user execute a checkout transaction with the merchant using the user device based on the checkout duration; providing item location information associated with the merchant based on the shopping duration; or providing discount information for the merchant based on the shopping duration or the checkout duration.

In a second implementation, alone or in combination with the first implementation, detecting the first entry and the second entry may be based on first GPS coordinates associated with the user device and second GPS coordinates associated with the merchant area. In a third implementation, alone or in combination with one or more of the first and second implementations, the checkout area may be determined from an output of a machine learning model.

In a fourth implementation, alone or in combination with one or more of the first through third implementations, the notification management platform may transmit a notification to the user device providing discount information when the movement of the first user device is within the shopping area. In a fifth implementation, alone or in combination with one or more of the first through fourth implementations, the notification management platform may detect an exit of the user device from the merchant area prior to detecting the transaction between the user and the merchant, and transmit a notification to the user device that relates to one or more of providing item location information associated with the merchant or providing discount information for the merchant.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    detecting, by a device, a first entry of a first user device into a merchant area by determining that a location of the first user device is within a geofence associated with a geographic area of the merchant area,
        wherein the geofence being defined by a plurality of location coordinates,
            the plurality of location coordinates including latitude and longitude coordinates;
        wherein the first user device is associated with a first user,
        wherein the geographic area of the merchant area is associated with a merchant, and
        wherein the first entry is associated with an entry time;
    determining, by the device and using a machine learning model, a location of a checkout area of the merchant area, the machine learning model to receive one or more parameters and historical location data from one or more user devices,
the one or more parameters including one or more of:
locations of the one or more user devices prior to exiting the merchant area, or
locations of the one or more user devices when transactions with the merchant are registered, and
the machine learning model to output information associated with the location of the checkout area within the merchant area;
monitoring, by the device and based on detecting the first entry and based on determining the location of the checkout area, a movement of the first user device within the merchant area,
wherein the movement includes a transition from a shopping area of the merchant area to the checkout area,
wherein the transition is associated with a transition time;
detecting, by the device, a transaction between the first user and the merchant,
wherein the transaction is associated with a transaction time;
determining, by the device, a shopping duration for the first user based on the entry time and the transition time, and a checkout duration for the first user based on the transition time and the transaction time;
detecting, by the device, a second entry of a second user device into the merchant area,
wherein the second user device is associated with a second user; and
performing, by the device, one or more actions based on detecting the second entry,
wherein the one or more actions are performed selectively based on the shopping duration or the checkout duration of the first user.

2. The method of claim 1, wherein performing the one or more actions includes:
transmitting a notification to the second user device that relates to one or more of:
providing information on a shopping time or a checkout time associated with the merchant based on the shopping duration or the checkout duration,
requesting that the second user execute a checkout transaction with the merchant using the second user device based on the checkout duration,
providing item location information associated with the merchant based on the shopping duration, or
providing discount information for the merchant based on the shopping duration or the checkout duration.

3. The method of claim 1, wherein performing the one or more actions includes:
generating sale information for the merchant,
wherein the sale information is based on the shopping duration or the checkout duration.

4. The method of claim 1, wherein detecting the first entry or detecting the second entry is based on global positioning system (GPS) coordinates associated with the merchant area.

5. The method of claim 1, wherein the first user has elected to share information with the second user,
wherein the method further comprises:
transmitting a notification to the second user device indicating a location of the first user at the merchant based on the first user having elected to share the information with the second user.

6. The method of claim 1, wherein the movement is a first movement,
wherein performing the one or more actions includes:
monitoring, based on detecting the second entry, a second movement of the second user device within the merchant area; and
performing one or more additional actions based on the shopping duration or the checkout duration and based on whether the second movement is within the shopping area of the merchant area or the checkout area.

7. The method of claim 6, wherein the second movement is within the shopping area of the merchant area,
wherein performing the one or more additional actions includes:
transmitting a notification to the second user device providing discount information for the merchant based on the shopping duration or the checkout duration.

8. A device, comprising:
one or more memories; and
one or more processors, communicatively coupled to the one or more memories, configured to:
detect a first entry of a user device into a merchant area by determining that a location of the user device is within a geofence associated with a geographic area of the merchant area,
wherein the geofence being defined by a plurality of location coordinates,
the plurality of location coordinates including latitude and longitude coordinates;
wherein the user device is associated with a user,
wherein the geographic area of the merchant area is associated with a merchant, and
wherein the first entry is associated with an entry time;
determine, by using a machine learning model, a location of a checkout area of the merchant area,
the machine learning model to receive one or more parameters and historical location data from one or more user devices,
the one or more parameters including one or more of:
locations of the one or more user devices prior to exiting the merchant area, or
locations of the one or more user devices when transactions with the merchant are registered, and
the machine learning model to output information associated with the location of the checkout area within the merchant area;
monitor, based on detecting the first entry and based on determining the location of the checkout area, a movement of the user device within the merchant area,
wherein the movement includes a transition from a shopping area of the merchant area to the checkout area,
wherein the transition is associated with a transition time;
detect a transaction between the user and the merchant,
wherein the transaction is associated with a transaction time;
determine, based on detecting the transaction, a shopping duration for the user based on the entry time and the transition time, and a checkout duration for the user based on the transition time and the transaction time;
detect a second entry of the user device into the merchant area; and
perform one or more actions based on detecting the second entry,
wherein the one or more actions are performed selectively based on the shopping duration or the checkout duration of the user.

9. The device of claim 8, wherein the one or more processors, when performing the one or more actions, are configured to:
transmit a notification to the user device that relates to one or more of:
providing information on the shopping duration or the checkout duration,
requesting that the user execute a checkout transaction with the merchant using the user device based on the checkout duration,
providing item location information associated with the merchant based on the shopping duration, or
providing discount information for the merchant based on the shopping duration or the checkout duration.

10. The device of claim 8, wherein detecting the first entry and the second entry is based on first global positioning system (GPS) coordinates associated with the user device and second GPS coordinates associated with the merchant area.

11. The device of claim 8, wherein the one or more processors are further configured to:
transmit a notification to the user device providing discount information when the movement of the first entry of the user device is within the shopping area.

12. The device of claim 8, wherein the one or more processors are further configured to:
detect an exit of the user device from the merchant area prior to detecting the transaction between the user and the merchant; and
transmit a notification to the user device that relates to one or more of:
providing item location information associated with the merchant, or
providing discount information for the merchant.

13. The device of claim 8, wherein the one or more processors are further configured to:
receive transaction data from a transaction device of the merchant; and
wherein the one or more processors, detecting the transaction, are configured to:
detect the transaction between the user and the merchant based on the transaction data.

14. A non-transitory computer-readable medium storing instructions, the instructions comprising:
one or more instructions that, when executed by one or more processors, cause the one or more processors to:
detect a first entry of a first user device into a merchant area by determining that a location of the first user device is within a geofence associated with a geographic area of the merchant area,
wherein the geofence being defined by a plurality of location coordinates,
the plurality of location coordinates including latitude and longitude coordinates;
wherein the first user device is associated with a first user,
wherein the geographic area of the merchant area is associated with a merchant, and
wherein the first entry is associated with an entry time;
determine, by using a machine learning model, a location of a checkout area of the merchant area,
the machine learning model to receive one or more parameters and historical location data from one or more user devices,
the one or more parameters including one or more of:
locations of the one or more user devices prior to exiting the merchant area, or
locations of the one or more user devices when transactions with the merchant are registered, and
the machine learning model to output information associated with the location of the checkout area within the merchant area;
monitor, based on detecting the first entry and based on determining the location of the checkout area, a movement of the first user device within the merchant area,
wherein the movement includes a transition from a shopping area of the merchant area to the checkout area,
wherein the transition is associated with a transition time;
detect a transaction between the first user and the merchant,
wherein the transaction is associated with a transaction time;
determine a shopping duration for the first user based on the entry time and the transition time, and a checkout duration for the first user based on the transition time and the transaction time;
detect a second entry of a second user device into the merchant area,
wherein the second user device is associated with a second user; and
perform one or more actions based on detecting the second entry,
wherein the one or more actions are performed selectively based on the shopping duration or the checkout duration of the first user.

15. The non-transitory computer-readable medium of claim 14, wherein the one or more instructions, that cause the one or more processors to perform the one or more actions, cause the one or more processors to:
transmit a notification to the second user device that relates to one or more of:
providing information on a shopping time or a checkout time associated with the merchant based on the shopping duration or the checkout duration,
providing item location information associated with the merchant based on the shopping duration, or
providing discount information for the merchant based on the shopping duration or the checkout duration.

16. The non-transitory computer-readable medium of claim 14, wherein the movement is a first movement,
wherein the one or more instructions, that cause the one or more processors to perform the one or more actions, cause the one or more processors to:
monitor, based on detecting the second entry, a second movement of the second user device within the merchant area; and perform one or more additional actions based on the shopping duration or the checkout duration and based on whether the second movement is within the shopping area of the merchant area or the checkout area of the merchant area.

17. The non-transitory computer-readable medium of claim 14, wherein the one or more instructions, that cause the one or more processors to perform the one or more actions, cause the one or more processors to:
  generate sale information for the merchant,
    wherein the sale information is based on the shopping duration or the checkout duration.

18. The non-transitory computer-readable medium of claim 14, wherein the first user has elected to share information with the second user, and
  wherein the instructions further include:
    one or more instructions that cause the one or more processors to transmit a notification to the second user device indicating a location of the first user at the merchant based on the first user having elected to share the information with the second user.

19. The non-transitory computer-readable medium of claim 14, wherein the instructions further include:
  one or more instructions that cause the one or more processors to transmit a notification to the first user device providing discount information when the movement of the first user device is within the shopping area.

20. The non-transitory computer-readable medium of claim 14, wherein the instructions further include:
  one or more instructions that cause the one or more processors to:
    detect an exit of the first user device from the merchant area prior to detecting the transaction between the first user and the merchant; and
    transmit a notification to the first user device that relates to one or more of:
      providing item location information associated with the merchant, or providing discount information for the merchant.

\* \* \* \* \*